United States Patent
Moorlag et al.

(10) Patent No.: US 9,359,512 B2
(45) Date of Patent: Jun. 7, 2016

(54) AQUEOUS DISPERSIBLE SILOXANE-CONTAINING POLYMER INKS USEFUL FOR PRINTING

(71) Applicant: XEROX CORPORATION, Norwalk, CT (US)

(72) Inventors: Carolyn Moorlag, Mississauga (CA); Marcel Breton, Mississauga (CA); Guerino Sacripante, Oakville (CA); Ke Zhou, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 7 days.

(21) Appl. No.: 14/139,811

(22) Filed: Dec. 23, 2013

(65) Prior Publication Data

US 2015/0175821 A1    Jun. 25, 2015

(51) Int. Cl.
*C09D 11/104* (2014.01)
*C09D 11/02* (2014.01)
*C09D 11/102* (2014.01)

(52) U.S. Cl.
CPC .............. *C09D 11/104* (2013.01); *C09D 11/02* (2013.01); *C09D 11/102* (2013.01)

(58) Field of Classification Search
None
See application file for complete search history.

(56) References Cited

U.S. PATENT DOCUMENTS

| | | | |
|---|---|---|---|
| 3,945,957 | A | 3/1976 | Noshiro et al. |
| 4,304,601 | A | 12/1981 | Sharp |
| 4,403,550 | A | 9/1983 | Sharp |
| 4,806,391 | A | 2/1989 | Shorin |
| 6,664,015 | B1 * | 12/2003 | Sacripante ......... C08G 63/6886 430/108.1 |
| 2004/0063809 | A1 * | 4/2004 | Fu et al. ....................... 523/160 |
| 2012/0103212 | A1 | 5/2012 | Stowe et al. |
| 2012/0103213 | A1 | 5/2012 | Stowe et al. |
| 2013/0104756 | A1 | 5/2013 | Stowe et al. |
| 2014/0235752 | A1 | 8/2014 | Gharapetian et al. |

FOREIGN PATENT DOCUMENTS

WO      2013/119539 A1    8/2013

OTHER PUBLICATIONS

Communication dated May 4, 2015 issued in European Patent Application No. 14196839.6, pp. 1-5.

\* cited by examiner

*Primary Examiner* — An Do
*Assistant Examiner* — Renee I Wilson
(74) *Attorney, Agent, or Firm* — MH2 Technology Law Group LLP

(57) ABSTRACT

A siloxane-containing ink composition for variable data lithographic printing includes a nano-particle polymer or blend of nano-particle polymers, wherein the polymer or polymers of the blend are water dispersible at temperatures below 100 degrees Celsius; and solids content is in an amount of greater than 25 percent by total weight.

24 Claims, 3 Drawing Sheets

P IS 5 TO 15% BY WEIGHT

AQUEOUS DISPERSIBLE SILOXANE-CONTAINING POLYMER INKS USEFUL FOR PRINTING

RELATED APPLICATIONS

This application relates to U.S. patent application Ser. No. 14/139,690, titled "Methods for Ink-Based Digital Printing with High Ink Transfer Efficiency", filed on Dec. 23, 2013; and U.S. patent application Ser. No. 14/139,708, titled "Aqueous Dispersible Polymer Inks", filed on Dec. 23, 2013, the disclosures of which are hereby incorporated by reference herein in their entireties.

FIELD OF DISCLOSURE

The disclosure relates to inks for printing images on substrates such as paper, plastic, metal, or other printable materials. In particular, the disclosure relates to siloxane-containing aqueous dispersible polymer inks particularly suitable for use in ink-based digital printing systems.

BACKGROUND

Conventional aqueous thermal ink jet or piezo aqueous inks have been found to cause cockle, curl and/or showthrough, which is readily apparent when printing on plain paper, particularly if the amount of water in the ink exceeds 50% by weight. Also, printing on non-porous substrate requires specialized ink formulations with binders incorporated, and drying systems that often limit print speed and increase cost per prints.

A number of approaches have been used to increase the printing latitude of aqueous inks including the use of hydrophobic and/or coagulating undercoat on the substrate. The use of undercoats increases cost and complexity of the printing system and cannot be applied universally to all types of substrates, including plain and coated paper.

Digital offset lithography printing systems require-offset type inks that are specifically designed and optimized to be compatible with various subsystems, including an ink delivery system and a laser imaging system, to enable high quality printing at high speed. Related art inks are soluble in dampening fluid such as octamethylcyclotetrasiloxane, may cause image background, are costly, and accommodate a narrow design space.

SUMMARY

There is a need for an aqueous based ink composition designed to provide improved print quality on a variety of substrates. There is also a need for improved inks that do not require stirring on standing and would be able to form films with minimum heating of the substrate onto which they are printed. In addition, there is a need for a printing technology that achieves excellent printing performance on a variety of substrates at a low ink manufacturing cost.

High solids content (greater than 25%) aqueous ink comprising dispersible polymers or blends of polymers as nano-sized particles are provided. Water based inks lower ink costs and expand market applications, while nano-sized particles enable high image performance, thin image layers, and improve transferability when an intermediate roll or belt is used. Dispersible polymers of inks in accordance with embodiments self-coalesce to form a robust film upon drying.

Aqueous inks are advantageous at least because they are cost-effective, do not tend to degrade printing system components such as surface of an imaging member, and are inherently non-soluble in dampening fluid such as octamethylcyclotetrasiloxane. Inks are provided that are highly viscous, have a low water content (less than 60%). The inks are formed in accordance with the embodiments and include dispersible siloxane-containing polymers as nano-sized particles. The nano-sized dispersible polymers enable high speed, high image quality performance, formation of thin image layers, and improved transferability.

It has been found that dispersible polymers form a robust film upon drying. The incorporation of siloxane components into the dispersible polymers has been found to improve transfer and wetting ability of hydrophobic surfaces. Improved wetting ability reduces a need for ink additives, which may swell surface material onto which an ink layer is deposited.

In an embodiment, an ink composition for variable data offset printing process that uses an intermediate substrate may include a nano-particle polymer or blend of nano-particle polymers, wherein the polymer or polymers of the blend are water dispersible, and wherein the polymer or a polymer of the blend comprises a siloxane monomer; and the total solids content is an amount in a range of about 25% or greater. In an embodiment, the total solids content may be an amount in a range of about 25% to about 50%. In another embodiment, the total solids content may be greater than 50%.

In an embodiment, the polymer blend may include a siloxane monomer and one or more components selected from the group comprising sulfonated styrene, styrene, sulfonated polyester, carboxyl-polyester, polyester, sulfonated styrene, styrene, glycols, multifunctional glycols, alcohols, multifunctional alcohols, acids, and salts. In an embodiment, the polymer or polymers of the polymer blend may have a molecular weight between 5000 and 20,000.

In an embodiment, the polymer or polymers of the polymer blend may contain a portion that is water soluble in an amount less than 10%, and is soluble in a non-aqueous liquid vehicle in an amount less than 30%, at a temperature between 20 and 50 degrees Celsius. In an embodiment, the nano-particle polymer or polymers of the blend may include an unsaturated functional group, the unsaturated functional group being present in an amount lying in a range from 5% by weight to 15% by weight. In embodiment, the polymer or a polymer of the polymer blend comprises an unsaturated functional group.

In an embodiment, the ink composition may include a co-solvent, the co-solvent having a surface tension of about 15 dynes/centimeter to about 30 dynes/centimeter, the co-solvent being selected from the group comprising alcohols, glycols, alkyl pyrrolidinones, isopropanol, ketones selected from the group consisting essentially of methyl ethyl ketone, amino alcohol and DMSO. In an embodiment, the nano-particle polymers may be less that 1 micron in size, or less than 500 nm, or less than 200 nm, or less than 20 nm or mixtures of nanoparticles forming bimodal or trimodal distributions. In an embodiment, the solids content of the ink may include one or mixtures of the following: nano-particle polymer resin, inorganic particles, silica, pigment, salts, bioside, buffer, or humectant. In an embodiment, the ink composition may include a self-dispersing pigment of a particle size between 5 to 200 nm, wherein the pigment is chemically modified or resin encapsulated.

In an embodiment, the ink composition may have a solids content including resin encapsulating a self-dispersing pigment forming a nano-particle polymer. In another embodiment, the ink composition may include a surfactant. The resin that is used to encapsulate the pigment s may be between 9 percent and 66 percent of the combined weight of the pigment and the encapsulating resin.

In an embodiment, the ink composition may have a viscosity of ink of about 10 centipoise to about 1,000,000 centipoise in the temperature range of 20 degrees Celsius to 50 degrees Celsius. In another embodiment, the ink composition may have a viscosity of ink after loss of 0 to 80 percent of liquid vehicle wherein the viscosity is between 10,000 centipoise and 1,000,000,000 centipoise at temperatures between 10 degrees Celsius to about 90 degrees Celsius.

In an embodiment, the polymer or polymer blend may have a critical phase separation temperature of about 50 degrees Celsius to about 90 degrees Celsius. In an embodiment, the surface tension of the ink is between 15 and 40 dynes/centimeter at 25 degrees C., or over the temperature range between 20 to 50 degrees C. In an embodiment, a density range of the ink is between about 0.95 to 1.3, or between 1.1 and 1.2 g/mL.

In an embodiment, methods of printing using high solids content siloxane-containing inks may include applying an ink comprising a nano-particle polymer or blend of nano-particle polymers to an intermediate transfer member, wherein the polymer or polymers of the blend are water dispersible, wherein the polymer or a polymer of the blend comprises a siloxane monomer; and a solids content is in an amount of about 25% to about 50% by weight. In an embodiment, methods may include the intermediate transfer member having a surface tension of about 18 dynes/centimeter to about 25 dynes/centimeter. In an embodiment, the intermediate transfer member may have a surface comprising silicone or fluorosilicone.

In an embodiment, methods may include applying the ink at an ink temperature above the upper critical phase separation temperature, the upper critical phase separation temperature being about 30 degrees Celsius to about 50 degrees Celsius; cooling the ink on the intermediate transfer member; and transferring the ink from the intermediate transfer member to a printable substrate. In an embodiment, the applying may further include forming a thin film having a surface tension of about 20 dynes/centimeter to about 30 dynes/centimeter.

Exemplary embodiments are described herein. It is envisioned, however, that any system that incorporates features of systems described herein are encompassed by the scope and spirit of the exemplary embodiments.

DETAILED DESCRIPTION

Figure 1:
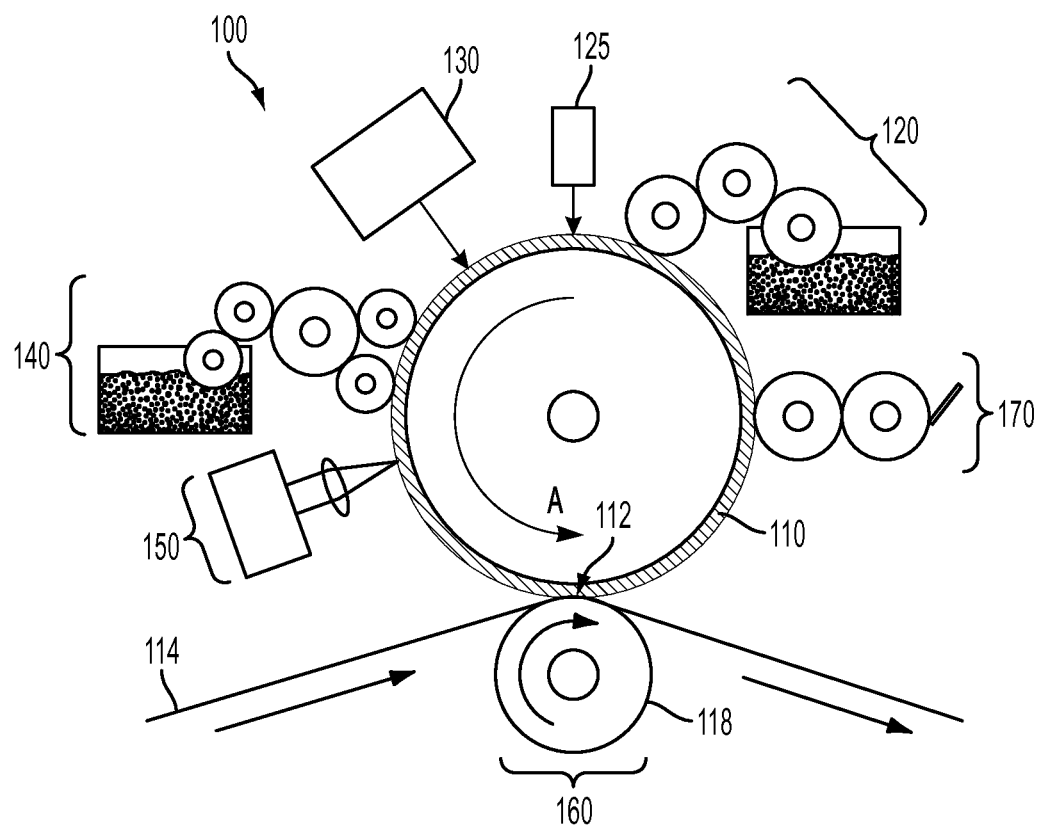
FIG. 1 shows a side diagrammatical view of a related art ink-based digital printing system with which siloxane-containing inks of embodiments may be used in methods in accordance with embodiments.

Exemplary embodiments are intended to cover all alternatives, modifications, and equivalents as may be included within the spirit and scope of the apparatus and systems as described herein.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

Reference is made to the drawings to accommodate understanding of inks, methods, and systems of embodiments. In the drawing, like reference numerals are used throughout to designate similar or identical elements.

Aqueous inks in accordance with embodiments are suitable for ink-based digital printing. "Variable data lithography printing," or "ink-based digital printing," or "digital offset printing" is lithographic printing of variable image data for producing images on a substrate that are changeable with each subsequent rendering of an image on the substrate in an image forming process. "Variable data lithographic printing" includes offset printing of ink images using lithographic ink wherein the images are based on digital image data that may vary from image to image. Ink-based digital printing uses a variable data lithography printing system, or digital offset printing system. A "variable data lithography system" is a system that is configured for lithographic printing using lithographic inks and based on digital image data, which may be variable from one image to the next.

By way of example, an ink-based digital printing system with anilox roll ink delivery subsystem for use with inks of embodiments is described herein. U.S. patent application Ser. No. 13/095,714 ("714 Application"), titled "Variable Data Lithography System," filed on Apr. 27, 2011 by Stowe et al., which is commonly assigned, and the disclosure of which is hereby incorporated by reference herein in its entirety, describes an exemplary variable data lithography system 100 for ink-based digital printing in FIG. 1. A general description of the exemplary system 100 shown in FIG. 1 is provided here. Additional details regarding individual components and/or subsystems shown in the exemplary system 100 of FIG. 1 may be found in the 714 Application.

As shown in FIG. 1, the exemplary system 100 may include an imaging member 110. The imaging member 110 in the embodiment shown in FIG. 1 is a drum, but this exemplary depiction should not be interpreted so as to exclude embodiments wherein the imaging member 110 includes a drum, plate or a belt, or another now known or later developed configuration. The reimageable surface may be formed of materials including, for example, a class of materials commonly referred to as silicones, including polydimethylsiloxane (PDMS), among others. For example, silicone, fluorosilicone, and/or VITON may be used. The reimageable surface may be formed of a relatively thin layer over a mounting layer, a thickness of the relatively thin layer being selected to balance printing or marking performance, durability and manufacturability.

The imaging member 110 is used to apply an ink image to an image receiving media substrate 114 at a transfer nip 112. The transfer nip 112 is formed by an impression roller 118, as part of an image transfer mechanism 160, exerting pressure in the direction of the imaging member 110. Image receiving medium substrate 114 should not be considered to be limited to any particular composition such as, for example, paper, plastic, or composite sheet film. The exemplary system 100 may be used for producing images on a wide variety of image receiving media substrates. The 714 Application also explains the wide latitude of marking (printing) materials that may be used, including marking materials with pigment densities greater than 10% by weight. As does the 714 Application, this disclosure will use the term ink to refer to a broad range of printing or marking materials to include those which are commonly understood to be inks, pigments, and other materials which may be applied by the exemplary system 100 to produce an output image on the image receiving media substrate 114.

The 714 Application depicts and describes details of the imaging member 110 including the imaging member 110 being comprised of a reimageable surface layer formed over a structural mounting layer that may be, for example, a cylindrical core, or one or more structural layers over a cylindrical core.

The exemplary system 100 includes a dampening fluid system 120 generally comprising a series of rollers, which may be considered as dampening rollers or a dampening unit, for uniformly wetting the reimageable surface of the imaging member 110 with dampening fluid. A purpose of the dampening fluid system 120 is to deliver a layer of dampening fluid, generally having a uniform and controlled thickness, to the reimageable surface of the imaging member 110. As indicated above, it is known that a dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Exemplary dampening fluids include water, Novec 7600 (1,1,1,2,3,3-Hexafluoro-4-(1,1,2,3,3,3-hexafluoropropoxy)pentane and has CAS #870778-34-0.), and D4 (octamethylcyclotetrasiloxane). Other suitable dampening fluids are disclosed, by way of example, in co-pending U.S. patent application Ser. No. 13/284,114, filed on Oct. 28, 2011, titled "Dampening Fluid for Digital Lithographic Printing," the disclosure of which is hereby incorporated herein by reference in its entirety.

Once the dampening fluid is metered onto the reimageable surface of the imaging member 110, a thickness of the dampening fluid may be measured using a sensor 125 that may provide feedback to control the metering of the dampening fluid onto the reimageable surface of the imaging member 110 by the dampening fluid system 120.

After a precise and uniform amount of dampening fluid is provided by the dampening fluid system 120 on the reimageable surface of the imaging member 110, and optical patterning subsystem 130 may be used to selectively form a latent image in the uniform dampening fluid layer by image-wise patterning the dampening fluid layer using, for example, laser energy. Typically, the dampening fluid will not absorb the optical energy (IR or visible) efficiently. The reimageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 Application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the reimageable surface of the imaging member 110 is presented to an inker subsystem 140. The inker subsystem 140 is used to apply a uniform layer of ink over the layer of dampening fluid and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface. The inker subsystem 140 may deposit the ink to the pockets representing the imaged portions of the reimageable surface, while ink on the unformatted portions of the dampening fluid will not adhere to those portions.

The cohesiveness and viscosity of the ink residing in the reimageable layer of the imaging member 110 may be modified by a number of mechanisms. One such mechanism may involve the use of a rheology (complex viscoelastic modulus) control subsystem 150. The rheology control system 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the reimageable surface of the imaging member 110 to a substrate of image receiving medium 114 using a transfer subsystem 160. The transfer occurs as the substrate 114 is passed through a nip 112 between the imaging member 110 and an impression roller 118 such that the ink within the voids of the reimageable surface of the imaging member 110 is brought into physical contact with the substrate 114. With the adhesion of the ink having been modified by the rheology control system 150, modified adhesion of the ink causes the ink to adhere to the substrate 114 and to separate from the reimageable surface of the imaging member 110. Careful control of the temperature and pressure conditions at the transfer nip 112 may allow transfer efficiencies for the ink from the reimageable surface of the imaging member 110 to the substrate 114 to exceed 95%. While it is possible that some dampening fluid may also wet substrate 114, the volume of such a dampening fluid will be minimal, and will rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method. Following the transfer of the majority of the ink to the substrate 114, any residual ink and/or residual dampening fluid must be removed from the reimageable surface of the imaging member 110, preferably without scraping or wearing that surface. An air knife may be employed to remove residual dampening fluid. It is anticipated, however, that some amount of ink residue may remain. Removal of such remaining ink residue may be accomplished through use of some form of cleaning subsystem 170. The 714 Application describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the dampening fluid of the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 Application details other mechanisms by which cleaning of the reimageable surface of the imaging member 110 may be facilitated. Regardless of the cleaning mechanism, however, cleaning of the residual ink and dampening fluid from the reimageable surface of the imaging member 110 is essential to preventing ghosting in the proposed system. Once cleaned, the reimageable surface of the imaging member 110 is again presented to the dampening fluid system 120 by which a fresh layer of dampening fluid is supplied to the reimageable surface of the imaging member 110, and the process is repeated.

The imaging member reimageable surface may comprise a polymeric elastomer, such as silicone rubber and/or fluorosilicone rubber. The term "silicone" is well understood in the art and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms, while the term "fluorosilicone" is used to cover the class of siloxanes that contain fluorine atoms. Other atoms may be present in the silicone rubber, for example nitrogen atoms in amine groups which are used to link siloxane chains together during crosslinking. The side chains of the polyorganosiloxane can also be alkyl or aryl.

As discussed above, inks that are useful for ink-based digital offset printing must possess physical and chemical properties that meet the specific demands of ink-based digital printing systems such as the system shown in FIG. 1. The ink must be compatible with materials that it comes into contact with, including the imaging plate and dampening fluid, and printable substrates such as paper, metal, or plastic. The ink must also meet all functional requirements of the subsystems as imposed by wetting and transfer properties defined by subsystem architecture and material sets.

Inks formulated for ink-based digital printing, or digital offset inks, are different in many ways from other inks developed for printing applications, including pigmented solvents, UV gel inks, and other inks. For example, digital offset inks contain much higher pigment and therefore have higher viscosity at room temperature than other inks, which can make ink delivery by way of an anilox roll system difficult. Digital offset ink should not cause the imaging member surface to swell and should be compatible with dampening fluid options. Water-dilutable and water-diluted inks in accordance with embodiments include digital offset acrylate inks meeting such requirements.

Digital offset inks in accordance with water-containing ink embodiments advantageously have a much lower solubility in dampening fluid such as D4 than related art inks. Also, digital offset inks of embodiments do not tend to swell a silicone-containing imaging member surface layer used in ink-based digital printing systems such as that shown in FIG. 1, which may be a silicone, fluorosilicone, or VITON-containing imaging plate or blanket.

The ink in accordance with embodiments is a dispersible polymer ink having a high solids content of greater than 25 percent, for example, and a low water content of less than 75 percent. For example, an ink composition in accordance with embodiments has a water content of less than 60%, and may include nano-particles that are polymers and/or polymer blends. Aqueous inks enable minimized ink manufacturing costs and are preferred by some customers for their low toxicity and expanded market applications, while the nano-sized particles enable high quality image performance, thin image layers, and improve transferability.

The percent solids in the ink composition may comprise of one or mixtures of the following: nano-particle polymer resin, inorganic particles, silica, pigment, salts, bioside, buffer, or humectant. The solid loading content in the ink in embodiments may preferably be greater than 25% to about 50%, or greater than 50% in other embodiments.

Dispersible nano-particle polymers of inks in accordance with embodiments include polymers that self-coalesce to form a robust film upon drying. Exemplary polymers include: polyester, polystyrene, sulphonated polystyrene, sulphonated polyester, polyurethane elastomers, and polymer mixtures.

Dispersible polymer inks contain substantially no surfactant, substantially no dispersant, and do not emulsify to form an emulsion. Polymer inks in accordance with embodiments may contain a nano-particle polymer, or blend of nano-particle polymers and are water dispersible within the temperature range of 20 to 50 degrees Celsius. The temperature range for lithographic printing is in this temperature range. A portion, less than 10 percent, of the nano-particle polymer may be soluble in the ink formulation within the temperature range of 20 to 50 degrees Celsius.

Inks in accordance with embodiments include low water content inks having advantageous wetting properties when transferred to an intermediate transfer member. In an exemplary embodiment, the surface of the transfer member may have a critical surface tension between about 18 dynes/cm and about 25 dynes/cm. Exemplary surface materials may include silicone (24 dynes/cm), and fluorosilicone (19-24 dynes/cm) or fluoroelastomer (24-34 dynes/cm). Inks in accordance with embodiments include low water content inks having, in addition to water, at least one co-solvent with a surface tension of between about 15 dynes/cm and about 30 dynes/cm. Exemplary co-solvents include isopropanol or similar alcohols (22-23 dynes/cm), methyl ethyl ketone (23-25 dynes/cm), and DMSO (25 dynes/cm). While these examples are suitable for inks printed at room temperature, for example, other co-solvents useful at higher temperatures may also be suitable if, for example, the inks are heated to accelerate water evaporation on the intermediate member or central imaging member of an ink-based digital printing system. Other examples of co-solvents include glycols, alkyl pyrrolidinones, and amino alcohols.

Methods of printing with inks in accordance with embodiments having enhanced wetting/release properties may include applying low water content ink onto an intermediate member or central imaging member having, for example, a fluorosilicone surface. The surface tension of the ink may be dynamically adjusted with the use of a solid surfactant or a small concentration of a liquid surfactant.

Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide(di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenylhydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy)ethanol, available from Rhone-Poulenc as IGEPAL CA-210™ IGEPAL CA-520™, IGEPAL CA-720™, IGEPAL CO-890™, IGEPAL C0-720™, IGEPAL C0-290™, IGEPAL CA-21O™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGENSC™ available from Daiichi Kogyo Seiyaku, combinations thereof, and the like.

Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, odecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

Suitable surfactants and wetting or dispersing agents also include TERGITOL TMN series available from Dow, 15-S series available from Dow, STRODEX PK-90 available from Ashland, superspreading Silwet surfactants such as Silwet L77 available from Momentive Performance Materials, fluorinated surfactants available from 3M. Suitable surfactants may include polyether modified poly-dimethylsiloxan, BYK 333, ionic solution of polyacrylic copolymer, BYK 381, polyether modified poly-dimethylalkylsiloxane, BYK 307, and polyether modified polymethylalkylsiloxane available from BYK Chemie GmbH.

Suitable surfactants may include fluorosurfactants, FC 4430 and 4432, available from 3M, and ZONYL FSN available from Du Pont, Ltd. Suitable surfactants include DYHOL 604, from Air Products, Surfadone LP 100, available from ISP, SURFYNOL 2502, available from Air Products, TEGO GLIDE 410, TEGO GLIDE 100, TEGO FLOW 425, TEGO PROTECT 5000, TEGO PROTECT 5100, TEGO TWIN 4000, TEGO WET KL 245, TEGO WET 510, TEGOT WET 500, TEGO WET 270, TEGO WET 265, and TEGO TWIN 4000, commercially available from Degussa AG.

Suitable surfactants may also include THETAWET FS8050, commercially available from Innovative Chemical Technologies, BYK 347 and BYKDYNWET 800, commercially available from BYK Chemie GmbH, DYNOL 604 and DYNOL 810, commercially available from Air Product, SILSURF A004-AC-UP, commercially available from SILTECH, POLYFOX 136A, 156A, and 151N, available from OMNOVA, and CHEMGAURD S-764p, commercially available from Chemgaurd Chemical.

Inks in accordance with embodiments may be configured for enhanced robustness after transfer onto a printable substrate from an intermediate transfer member, for example. In particular, inks in accordance with embodiments may include a dissipatable nano-particle polymer or polymer blends wherein the polymer(s) comprise one or more unsaturated functional groups that enable photo-curing of the final transferred ink film for improved robustness. Inks in accordance with embodiments, the nano-particle polymer or polymer blend(s) of the ink composition may include high molecular weight water soluble polymers. The molecular weight range of the dispersible polymers is 5000 to 20,000. For example, exemplary embodiments may include polymers comprising a component selected from the group including sulfonated styrene, styrene, sulfo-polyester, carboxyl-polyester, polyester, sulfonated styrene, styrene, glycols, multifunctional glycols, alcohols, multifunctional alcohols, acids, and salts thereof. In embodiments, the dissipatable polymer may be a nano-particle that is less that 1 micron in size, or less than 500 nm, or less than 200 nm, or less than 20 nm. Other embodiments may contain dissipatable polymers as mixtures of nano-particles forming bimodal or trimodal distributions over the same ranges.

In an embodiment, the ink comprises a pigment that is encapsulated by, or aggregated with the dispersible polymer. In a preferred embodiment, the pigment is a self-dispersible pigment. For example, suitable pigments include black pigments, white pigments, cyan pigments, magenta pigments, yellow pigments, or the like. Further, pigments can be organic or inorganic particles. Suitable inorganic pigments include carbon black. However, other inorganic pigments may be suitable such as titanium oxide, cobalt blue (CoO—Al203), chrome yellow (PbCr04), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like.

Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226.

Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation.

Examples of black pigments that may be used include carbon pigments. The carbon pigment can be almost any commercially available carbon pigment that provides acceptable optical density and print characteristics. Carbon pigments suitable for use in systems and methods in accordance with embodiments may include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company.

Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle, for example.

The colorant can be present in the ink composition in any desired or effective amount. In embodiments, the colorant can be present in an amount of from about 0.05 percent to about 15 percent, or from about 0.1 percent to about 10 percent, or from about 1 to about 5 percent by weight, based on the total weight of the stretchable ink composition. Accordingly, inks in accordance with embodiments enable enhanced pigment stability for intermediate transfer printing applications.

Inks may possess a range of viscosity between about 10 centipoise to about 1,000,000 centipoise in the temperature range of 20 to 50 degrees C. This range of viscosity is suitable for digital offset printing that may be carried out in the 10 centipoise viscosity range. Follow depositing of ink onto an intermediate substrate, a rheological change may be brought about by the removal of water from the dispersible polymer ink. With a loss of about 50 to 80 percent of the liquid vehicle, the ink viscosity may be increased by multiple orders of magnitude, to a range between 10,000 to 1,000,000,000 centipoise. With this range of higher ink viscosity, transfer efficiency may be substantially improved to be greater than 80%, or greater than 90%, or greater than 95%.

Additional ink properties include a surface tension that enables wetting to an intermediate substrate and relatively increased density compared with inks of solid content loading <25%, for example. Surface tension of inks is in between 15 and 40 dynes/centimeter at 25 degrees C., or over the temperature range between 20 to 50 degrees C. Ink density is dependent on the loading of solids content and is between about 0.95 to 1.3, or between 1.1 and 1.2 g/mL The ink compositions in accordance with embodiments may comprise a mixture of water and a water soluble or water miscible organic component, referred to as a co-solvent, humectant, or the like (hereinafter co-solvent) such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxypropionic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof.

When mixtures of water and water soluble or miscible organic liquids are selected as the liquid vehicle, the water to organic ratio ranges can be any suitable or desired ratio, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The organic component of the ink vehicle can also serve to modify ink surface tension, modify ink viscosity, dissolve or disperse the colorant, and/or affect the drying characteristics of the ink.

In accordance with an embodiment, an ink composition may include a polymer that has a critical phase separation temperature lying in a range of about 50 degrees Celsius to about 90 degrees Celsius. When the ink composition is transferred to an intermediate transfer member surface having a temperature above the critical temperature, the viscosity of the ink is reduced for enhanced wetting. The viscosity increases upon cooling to enable enhanced transfer.

Inks in accordance with embodiments may be printed on an undercoat. The undercoat may comprise any suitable compounds that may help the drying process and generate images of higher print quality. This might for example be achieved by coagulating the pigment and/or dissipatable polymer so as to minimize film forming in the early stages of drying. If the ink is anionic in nature, the undercoat may comprise polymeric materials such as polyalkyleneimines and their derivatives such as polyethylenimine. Polymers that contain quaternary ammonium functionalities or divalent or trivalent metal salts are also suitable.

Additional pH controlling agents may also be included in the undercoat composition, if desired. Examples of such pH controlling agents suitable for undercoats of the present invention include, but are not limited to, acids; bases, including hydroxides of alkali metals such as lithium hydroxide, sodium hydroxide and potassium hydroxide, phosphate salts, carbonate salts, carboxylate salts, sulfite salts; amine salts; amines such as diethanolamine and triethanolamine; and mixtures thereof and the like.

When present, the pH controlling agent is preferably included in an amount of up to about 1 percent by weight, and preferably from about 0.01 to about 1 percent by weight. Appropriate selection of pH control agent may improve the effectiveness of the coagulation additive. Inks in accordance with embodiments may be formed on an undercoat resulting in coagulation of pigment and dissipatable nano-polymer on, for example, the intermediate transfer member or central imaging member surface that facilitates drying. Contrarily, related art inks form films that trap water, and reduce drying effectiveness. Ink compositions in accordance with embodiments may be configured for forming thin films having a critical surface tension of about 15 dynes/cm to about 40 dynes/cm, for example.

Ink compositions in accordance with embodiments comprise a nano-resin having siloxane in the resin backbone. The siloxane may be present in an amount greater than 10% by weight, or an amount lying in a range of about 2% to about 30% by weight. More preferably, the siloxane component may be present in a range of about 5% to about 15% by weight. It has been found that the addition of siloxane in this manner adds oil-less features that promotes release of the ink from an imaging member surface while promoting wet ink/plate wettability through siloxane compatibility and increased hydrophobicity.

Figure 2:
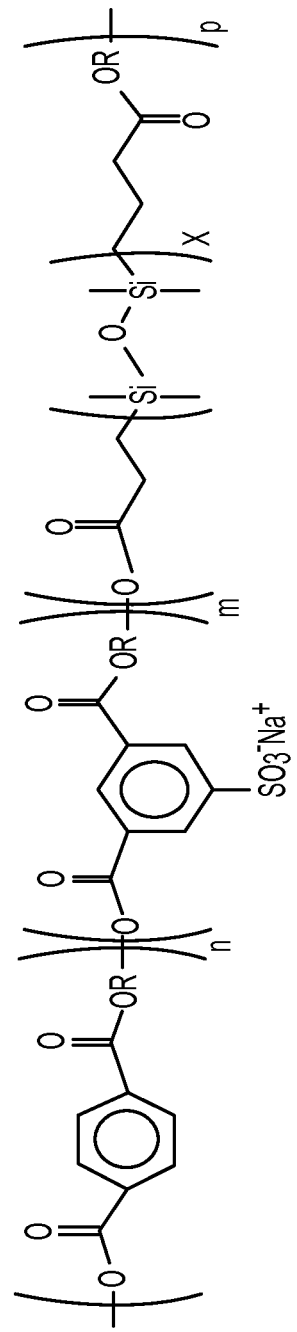
FIG. 2 shows a formula for sulphonated polyester-siloxane resin for ink in accordance with an exemplary embodiment.

Inks in accordance with embodiments may include the polymer comprising a component selected from the group comprising ethylene oxide, polyvinyl alcohol, and partially hydrolyzed PVOH derivatives. The polymer or polymers of the blend are water dispersible at temperatures below 100 degrees Celsius, and preferentially at temperatures between 20 to 50 degrees Celsius. The polymer or polymers of the blend may comprise an unsaturated functional group. The unsaturated functional group may include a siloxane monomer. In an embodiment, the co-solvent may have a surface tension of about 15 dynes/centimeter to about 30 dynes/centimeter. The co-solvent may be selected from the group comprising isopropanol, methyl ethyl ketone, and DMSO. Inks in accordance with embodiments, for example, may have a viscosity in a range of about 2.5 centipoise to about 8 centipoise. The polymer or polymers of the polymer blend may exhibit an upper critical phase separation temperature of about 30 degrees Celsius to about 50 degrees Celsius. FIG. 2 shows a sulphonated polyester-siloxane resin of an ink composition in accordance with an exemplary embodiment, where n refers to the molar portion of alkyl terephthalate monomer, m refers to the molar portion of sulphonated alkyl terephthalate monomer, p refers to the molar portion of siloxane containing alkyl polyester monomer, and x is the average chain length of the siloxane oligomer within each unit of p.

By way of example, low water content nano-particle dispersible polymer ink compositions in accordance with embodiments were formed. First, a sodio sulfonate polyester emulsion was formed. The emulsion included the following components: dimethylterepthalate (388 grams), sodium dimethyl 5-sulfoisophthalate (44 grams), propanediol (302 grams), diethylene glycol (34.2 grams), trimethylol propane (3 grams and butyltin oxide (0.8 grams).

The components were charged in a 1 liter Parr reactor equipped with a mechanical stirrer and distillation apparatus. The resulting mixture was heated to 175 degrees Celsius for about one hour. Then, the temperature was increased to 185 degrees Celsius and the mixture heated for an additional three hours. The temperature was then increased to 200 degrees Celsius and the pressure reduced from atmospheric pressure to about 0.5 Torr over a period of about two hours, during which time excess glycol was collected in a distillation receiver.

The mixture was discharged into the bottom of the drain to result in the product copoly(1,2-propylene-dipropylene-terephthalate)-copoly(1,2-propylene-dipro pylene-5-sodio-sulfo-isophthalate). The product polyester resin had a glass transition temperature of about 54.6° C., a number average molecular weight ($M_n$) of 3,500 grams per mole, and a weight average molecular weight ($M_w$) of 9,160 as measured by gel permeation chromatography using polystyrene as a standard. 10 Grams of the product polyester resin was then heated with 50 grams of water at 75 degrees Celsius for 1 hour to provide an emulsion of sulfonated polyester particles in water with an average size of about 50 nm.

An aqueous cyan pigment dispersion (17% in water) comprising Dowfax surfactant was heated to 80 degrees Celsius, and added to the dried solid sodio sulfonated polyester resin product. The mixture was stirred for one hour at room temperature. The amount of dispersion and resin included in each of example compositions A-E is shown in Table 1.

TABLE 1

| Examples | Pigment Dispersion (Mass, g) | Resin (Mass, g) | Pigment and Resin (Initial Mass, g) | Pigment and Resin (Final Mass, g) | % Pigment | % Resin | % Solids |
|---|---|---|---|---|---|---|---|
| A | 100 | 15 | 115 | 117.62 | 14.45 | 12.75 | 27.21 |
| B | 100 | 20 | 120 | 118.25 | 14.38 | 16.91 | 31.29 |

TABLE 1-continued

| Examples | Pigment Dispersion (Mass, g) | Resin (Mass, g) | Pigment and Resin (Initial Mass, g) | Pigment and Resin (Final Mass, g) | % Pigment | % Resin | % Solids |
|---|---|---|---|---|---|---|---|
| C | 100 | 25 | 125 | 118.70 | 14.32 | 21.06 | 35.38 |
| D | 100 | 30 | 130 | 128.25 | 13.26 | 23.39 | 36.65 |
| E | 100 | 35 | 135 | 130.35 | 13.04 | 26.85 | 39.89 |

It was found that ink A contained about 27% solid at a temperature of 25 degrees Celsius. Inks B-E had higher solid content, and thus required less evaporation of water to yield highly viscous ink. Inks containing less than 27% water were found to have a viscosity of less than 10 centipoise.

An aqueous Cyan Pigment dispersion (17% in water) containing Dowfax surfactant was heated to 80 degrees Celsius, and to this was added the solid (dry) sodio sulfonated siloxane-polyester resin. The mixture was left stirring for 1 hour, and then cooled to room temperature. The amounts of dispersion and resin are listed in Table 2.

TABLE 2

| sulfo-polyester-siloxane | Using ZK929-90 Mass of Pigment (g) | Mass of resin ZK929-90 (g) | Total Initial mass (Pig + Resin) (g) | Total Final mass (Pig + Resin) (g) | % pigment | % resin | Water loss (g) |
|---|---|---|---|---|---|---|---|
| ID 30941-87-H | 100 | 15 | 115 | 113.73 | 14.95 | 13.18913 | 1.27 |
| ID 30941-87-I | 100 | 20 | 120 | 114.26 | 14.88 | 17.50394 | 5.74 |

Ink compositions in accordance with embodiments are film-forming high solid content nano-particle aqueous dispersible polymer inks that are suitable for ink-based digital printing using an intermediate transfer member or central imaging member arranged in an offset architecture. The ink is configured for strong adherence to a variety of substrates.

EXAMPLE I

A nanoparticle, dispersible polymer, water-based ink formulation in accordance with embodiments was prepared and tested with imaging member surfaces comprising fluorosilicone, and with and without D4 dampening fluid.

A sodio sulfonate polyester-siloxane emulsion was prepared. The sodio sulfonated polyester-siloxane copolymer comprised 3.5% sodio-sulfonated moieties and 15% by weight of polysiloxane. The molar ratios of the copolymer (FIG. 2) dimethylterphthalate to dimethylsulfoisophthalate to dimethylsiloxane are n:m:x:p=1.00:0.86:0.61:1.09.

Dimethylterephthalate (313 grams), sodium dimethyl 5-sulfoisophthalate (38 grams), 1,2-propanediol (250 grams), diethylene glycol (37.5 grams), polydimethylsiloxane carbomethoxy terminated (Mw of 1000 g/mol) and butyltin oxide (1 gram) were charged in a 1 liter Parr reactor equipped with a mechanical stirrer and distillation apparatus. The mixture was heated to 175 degrees Celsius for about 1 hour, and then the temperature was increased to 185 degrees Celsius for an additional three hours during which time methanol byproduct was collected in the distillation receiver.

The mixture was then raised to about 200 degrees Celsius, and the pressure was reduced from atmospheric pressure to about 0.5 Torrs over a period of about two hours. During this time, the excess glycol was collected in the distillation receiver. The product was then discharged through the bottom drain valve to result in the product, with a glass transition temperature of about 55.2 degrees Celsius, a number average molecular weight ($M_n$) of 2,237 grams/mol, a weight average molecular weight ($M_w$) of 3,777 as measured by gel permeation chromatography using polystyrene as a standard.

Inks H and I contained 28 percent to 32 percent solid content. Rheology characterization for aqueous dispersible polymer inks placed the solids loading in the 10-100 centipoise range, with the ability to increase solids loading and viscosity. At this rheology range, ink is deliverable by anilox roller, and easier to deliver than paste-like offset inks. It is estimated that water evaporated by 50% will yield the correct rheology for offset transfer at 57 percent solid content, $1 \times 10^6$ centipoise. Thin layers of ink deposited during an ink-based digital printing process having a thickness of 0.5 microns will evaporate water quickly.

Inks H and I were tested for transfer from fluorosilicone test plates to paper by handrolling over D4 dampening fluid, and transferred from fluorosilicone to paper. Fluorosilicone test plates were prepared from Nusil 3510 fluorosilicone in a ratio of 10:1 fluorosilicone to crosslinker. Fluorosilicone formulation was coated over silicone substrates and cured at 160 degrees Celsius for 20 hours. Testing was performed by rolling out inks H and I on a transparency, applying the rolled out ink onto a plate, then transferring the applied ink to paper with pressure. The inks were found to partially dry on the timescale of hand experiments, and transfer efficiently from test plate to paper. The inks displayed wetting and excellent transferability in partially dried area. The fast drying character of water in the test inks made in accordance with embodiments is advantageous for high speed printing and can be optimized by adjusting solids loading of the ink.

It was found that polyester-siloxane resin ink blocked D4. The results were compared with polyester resin ink comparative test results. The comparison revealed that without the siloxane component, the base ink displays poor wetting and substantial beading, and requires the addition of extra components to function. It is believed that siloxane incorporation promotes inherent wettability or resin inks, reduces the need for ink additives, and interferes with imaging performance, causing contamination or undesirable background artifacts.

Figure 3:
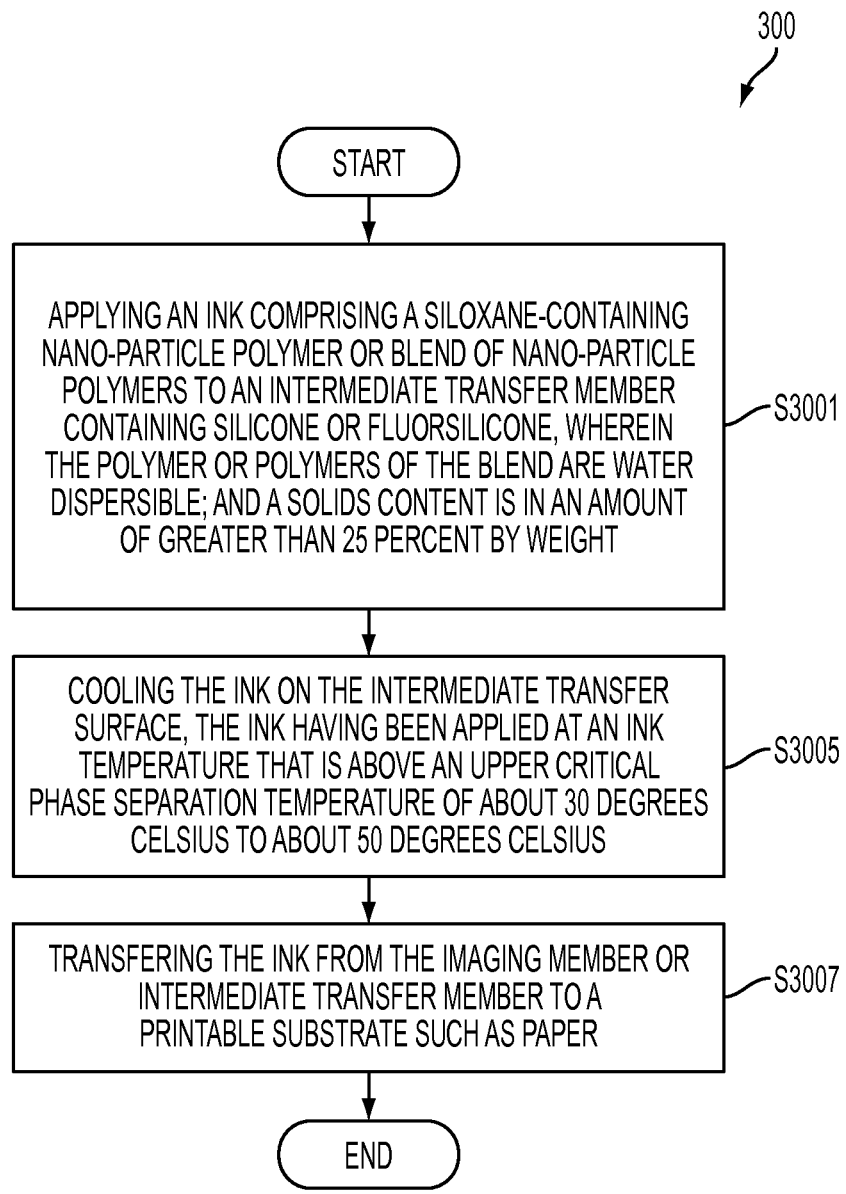
FIG. 3 shows methods for printing using high solids content siloxane-containing inks in accordance with embodiments.

In accordance with the foregoing, inks of embodiments are useful for printing processes including indirect printing, particularly ink-based digital printing. Methods of printing using high solids content inks are shown in FIG. 3. In particular, FIG. 3 shows methods 300 for printing using a high solids content inks. Methods may include applying at S3001 an ink comprising a nano-particle polymer or blend of nano-particle polymers to an imaging member or intermediate transfer member, wherein the polymer or polymers of the blend are water dispersible; and solids content is in an amount of greater than 25 percent by weight. The solids content may be in a range from 25% to 50% by weight, or may be more than 50% by weight. In an embodiment, the siloxane group may be present in an amount lying in a range of 5% to 15% by weight. The imaging member or intermediate transfer member may preferably have a surface tension of about 18 dynes/centimeter to about 25 dynes/centimeter. The ink in accordance with methods of embodiments comprises a polymer or blend of polymer that includes a siloxane monomer. The imaging member or intermediate transfer member may have a surface that includes silicone or fluorosilicone. The imaging member may be constitute a component of an ink-based digital printing system, for example. The intermediate transfer member may constitute a component of an ink-based digital printing system as shown in FIG. 1, for example.

At S3001, the applying may include applying the ink at an ink temperature above the upper critical phase separation temperature, the upper critical phase separation temperature being about 30 degrees Celsius to about 50 degrees Celsius. Further, the applied ink may form a film may have a surface tension of about 15 dynes/centimeter to about 40 dynes/centimeter. The ink may be applied using, for example, an anilox roll delivery subsystem.

Methods may include cooling at S3005 the ink on the imaging member or intermediate transfer member. Methods may include transferring at S3007 the ink from the imaging member or intermediate transfer member to a printable substrate such as paper, cardboard, plastic, or other suitable substrates.

It will be appreciated that the above-disclosed and other features and functions, or alternatives thereof, may be desirably combined into many other different compositions or formulations, systems or applications. Also, various presently unforeseen or unanticipated alternatives, modifications, variations or improvements therein may be subsequently made by those skilled in the art.

What is claimed is:

1. An ink composition for variable data offset printing process that uses an intermediate substrate, comprising:
    a nano-particle polymer or blend of nano-particle polymers, wherein the polymer or polymers of the blend are water dispersible, and wherein the polymer or a polymer of the blend comprises a siloxane monomer; and
    the total solids content is an amount in a range of about 25% or greater,
    wherein the ink composition has a viscosity of ink of about 10 centipoise to about 1,000,000 centipoise in the temperature range of 20 degrees Celsius to 50 degrees Celsius, and
    wherein the surface tension of the ink is between 15 and 40 dynes/centimeter at 25 degrees C., or over the temperature range between 20 to 50 degrees C.

2. The composition of claim 1, wherein the total solids content is an amount in a range of about 25% to about 50%.

3. The composition of claim 1, wherein the total solids content is greater than 50%.

4. The ink composition of claim 1, wherein the polymer blend comprises siloxane monomer and one or more components selected from the group comprising sulfonated styrene, styrene, sulfonated polyester, carboxyl-polyester, polyester, sulfonated styrene, styrene, glycols, multifunctional glycols, alcohols, multifunctional alcohols, acids, and salts.

5. The ink composition of claim 1, wherein the polymer or polymers of the polymer blend have a molecular weight between 5000 and 20,000.

6. The ink composition of claim 1, wherein the polymer or polymers of the polymer blend contains a portion that is water soluble in an amount less than 10%, and is soluble in a non-aqueous liquid vehicle in an amount less than 30%, at a temperature between 20 and 50 degrees Celsius.

7. The ink composition of claim 1, wherein the nano-particle polymer or polymers of the blend comprise an unsaturated functional group, the unsaturated functional group being present in an amount lying in a range from 5% by weight to 15% by weight.

8. The ink composition of claim 1, wherein the polymer or a polymer of the polymer blend comprises an unsaturated functional group.

9. The ink composition of claim 1, comprising:
    a co-solvent, the co-solvent having a surface tension of about 15 dynes/centimeter to about 30 dynes/centimeter, the co-solvent being selected from the group comprising alcohols, glycols, alkyl pyrrolidinones, isopropanol, ketones selected from the group consisting essentially of methyl ethyl ketone, amino alcohol and DMSO.

10. The ink composition of claim 1, wherein the nano-particle polymers are less that 1 micron in size, or less than 500 nm, or less than 200 nm, or less than 20 nm or mixtures of nanoparticles forming bimodal or trimodal distributions.

11. The ink composition of claim 1, wherein the solids content of the ink comprise one or mixtures of the following: nano-particle polymer resin, inorganic particles, silica, pigment, salts, bioside, buffer, or humectant.

12. The ink composition of claim 1, comprising:
    a self-dispersing pigment of a particle size between 5 to 200 nm, wherein the pigment is chemically modified or resin encapsulated.

13. The ink composition of claim 1, wherein the solids content comprises resin encapsulating a self-dispersing pigment forming a nano-particle polymer.

14. The composition of claim 1, further comprising the addition of a surfactant.

15. The composition of claim 1, the polymer or polymer blend having a critical phase separation temperature of about 50 degrees Celsius to about 90 degrees Celsius.

16. The composition of claim 1, wherein the density range is between about 0.95 to 1.3, or between 1.1 and 1.2 g/m L.

17. The composition of claim 13, wherein the resin that is used to encapsulate the pigment should be between 9 percent and 66 percent of the combined weight of the pigment and the encapsulating resin.

18. The composition of claim 1, wherein the siloxane monomer content of the polymer blend is in a range between 5% and about 30%.

19. A method of printing using high solids content siloxane-containing inks, comprising:
    applying an ink comprising a nano-particle polymer or blend of nano-particle polymers to an intermediate transfer member, wherein the polymer or polymers of the blend are water dispersible, wherein the polymer or a polymer of the blend comprises a siloxane monomer; and a solids content is in an amount of about 25% to about 50% by weight, wherein the ink has a viscosity of about 10 centipoise to about 1,000,000 centipoise in the temperature range of 20 degrees Celsius to 50 degrees Celsius, and wherein the surface tension of the ink is between 15 and 40 dynes/centimeter at 25 degrees C., or over the temperature range between 20 to 50 degrees C.

20. The method of claim 19, further comprising the intermediate transfer member having a surface tension of about 18 dynes/centimeter to about 25 dynes/centimeter.

21. The composition of claim 19, the intermediate transfer member having a surface comprising silicone or fluorosilicone.

22. The method of claim 19, the applying further comprising:
  applying the ink at an ink temperature above the upper critical phase separation temperature, the upper critical phase separation temperature being about 30 degrees Celsius to about 50 degrees Celsius;
  cooling the ink on the intermediate transfer member; and
  transferring the ink from the intermediate transfer member to a printable substrate.

23. The method of claim 22, the applying further comprising forming a thin film having a surface tension of about 20 dynes/centimeter to about 30 dynes/centimeter.

24. An ink composition for variable data offset printing process that uses an intermediate substrate, comprising:
  a nano-particle polymer or blend of nano-particle polymers, wherein the polymer or polymers of the blend are water dispersible, and wherein the polymer or a polymer of the blend comprises a siloxane monomer; and
  the total solids content is an amount in a range of about 25% or greater,
  wherein the ink composition has a viscosity of ink after loss of 0 to 80 percent of liquid vehicle that is between 10,000 centipoise and 1,000,000,000 centipoise at temperatures between 10 degrees Celsius to about 90 degrees Celsius, and wherein the surface tension of the ink is between 15 and 40 dynes/centimeter at 25 degrees C., or over the temperature range between 20 to 50 degrees C.

* * * * *